(12) United States Patent
Hashimoto et al.

(10) Patent No.: US 11,453,376 B2
(45) Date of Patent: Sep. 27, 2022

(54) VEHICLE CONTROL DEVICE, VEHICLE CONTROL SYSTEM, AND METHOD FOR CONTROLLING VEHICLE

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 17/068,937

(22) Filed: Oct. 13, 2020

(65) Prior Publication Data

US 2021/0114581 A1    Apr. 22, 2021

(30) Foreign Application Priority Data

Oct. 18, 2019  (JP) .............................. JP2019-191099

(51) Int. Cl.
*B60W 10/06* (2006.01)
*B60W 50/04* (2006.01)
*G06K 9/62* (2022.01)

(52) U.S. Cl.
CPC .......... *B60W 10/06* (2013.01); *B60W 50/045* (2013.01); *G06K 9/6262* (2013.01); *B60W 2510/0604* (2013.01)

(58) Field of Classification Search
CPC .............. B60W 10/06; B60W 50/045; B60W 2510/0604; B60W 2050/0075;
(Continued)

(56) References Cited

U.S. PATENT DOCUMENTS 6,549,815 B1 *  4/2003  Kaji ................... G05B 13/0285
                                                     700/32
2011/0145042 A1 *  6/2011  Green .................... G06Q 30/02
                                                     705/14.1
(Continued)

FOREIGN PATENT DOCUMENTS

JP  2007-15632 A   1/2007
JP  2016-006327 A  1/2016
(Continued)

*Primary Examiner* — Scott A Reinbold
(74) *Attorney, Agent, or Firm* — Oblon, McClelland, Maier & Neustadt, L.L.P.

(57) ABSTRACT

A vehicle control device includes a memory configured to store relationship definition data that defines a relationship between a state of a vehicle and an action variable, which is a variable relating to an operation of electronic equipment in the vehicle, and a processor. The processor is configured to execute acquisition processing of acquiring a detection value of a sensor, operation processing of operating the electronic equipment, reward calculation processing, update processing of updating the relationship definition data, detection processing, and switching processing of switching the relationship definition data to post-treatment data. The processor is configured to, based on the update mapping, output the relationship definition data updated to increase an expected return on the reward when the electronic equipment is operated in compliance with the relationship definition data.

17 Claims, 6 Drawing Sheets

(58) Field of Classification Search
CPC ......... B60W 2556/10; B60W 50/0098; B60W
2050/0052; B60W 2050/0088; B60W
2540/10; G06K 9/6262
USPC ........................................................ 701/102
See application file for complete search history.

(56) References Cited

U.S. PATENT DOCUMENTS

2017/0190357 A1* 7/2017 Kobayashi ............ G06F 9/4887
2019/0273817 A1* 9/2019 Ueno ...................... G08G 1/005
2022/0067765 A1* 3/2022 Cote .................... G07C 5/0808

FOREIGN PATENT DOCUMENTS

JP         2016006327 A  *  1/2016
JP         2018-106352 A    7/2018
WO    WO 2016/046930 A1   3/2016

* cited by examiner

VEHICLE CONTROL DEVICE, VEHICLE CONTROL SYSTEM, AND METHOD FOR CONTROLLING VEHICLE

INCORPORATION BY REFERENCE

The disclosure of Japanese Patent Application No. 2019-191099 filed on Oct. 18, 2019 including the specification, drawings and abstract is incorporated herein by reference in its entirety.

BACKGROUND

1. Technical Field

The present disclosure relates to a vehicle control device, a vehicle control system, and a method for controlling a vehicle.

2. Description of Related Art

For example, Japanese Unexamined Patent Application Publication No. 2016-6327 (JP 2016-6327 A) describes a control device that operates a throttle valve as an operating unit of an internal combustion engine mounted in a vehicle based on a value obtained through filter processing on an operation amount of an accelerator pedal.

SUMMARY

Incidentally, since the filter needs to set an opening degree of the throttle valve of the internal combustion engine mounted in the vehicle to an appropriate opening degree according to the operation amount of the accelerator pedal, there is a need for an expert to apply many man-hours for adaptation. In this way, hitherto, an expert has applied many man-hours for adaptation of an operation amount or the like of electronic equipment in a vehicle according to a state of the vehicle.

A first aspect of the present disclosure relates to a vehicle control device. The vehicle control device includes a memory and a processor. The memory is configured to store relationship definition data that defines a relationship between a state of a vehicle and an action variable, which is a variable relating to an operation of electronic equipment in the vehicle. The processor is configured to execute acquisition processing of acquiring a detection value of a sensor that is configured to detect the state of the vehicle. The processor is configured to execute operation processing of operating the electronic equipment based on a value of the action variable determined by the detection value acquired through the acquisition processing and the relationship definition data. The processor is configured to execute reward calculation processing of providing, based on the detection value acquired through the acquisition processing, a greater reward when a characteristic of the vehicle satisfies a criterion than when the characteristic of the vehicle does not satisfy the criterion. The processor is configured to execute update processing of updating the relationship definition data with the state of the vehicle based on the detection value acquired through the acquisition processing, the value of the action variable used for the operation of the electronic equipment, and the reward corresponding to the operation as inputs to update mapping determined in advance. The processor is configured to execute detection processing of detecting that function recovery treatment of a component having an influence on the state of the vehicle resulting from the operation in the operation processing among components in the vehicle is executed. The processor is configured to execute switching processing of, when the execution of the function recovery treatment is detected through the detection processing, switching the relationship definition data for use in the operation processing to post-treatment data that is data a predetermined period before the execution of the function recovery treatment. The processor is configured to, based on the update mapping, output the relationship definition data updated to increase an expected return on the reward when the electronic equipment is operated in compliance with the relationship definition data.

According to the first aspect, the reward accompanied by the operation of the electronic equipment is calculated, whereby it is possible to ascertain what kind of reward is obtained by the operation. Then, the relationship definition data is updated based on the reward through update mapping compliant with reinforcement learning, whereby it is possible to set the relationship between the state of the vehicle and the action variable to an appropriate relationship in traveling of the vehicle. Accordingly, in setting the relationship between the state of the vehicle and the action variable, it is possible to reduce man-hours requested to the expert.

Incidentally, when a component in the vehicle is deteriorated, or the like, the relationship definition data is updated through reinforcement learning to appropriate data when the deteriorated component is used. For this reason, thereafter, when the function recovery treatment is executed, there is a possibility that the relationship definition data is not appropriate data in making the expected return large. Accordingly, according to the first aspect, when the function recovery treatment is executed, the relationship definition data for use in the operation processing is switched to the post-treatment data through the switching processing, whereby it is possible to suppress a decrease in expected return due to the execution of the function recovery treatment.

In the first aspect, the switching processing may include processing of setting the relationship definition data updated through the update processing with traveling of the vehicle as the post-treatment data.

According to the first aspect, there is a high possibility that the relationship definition data updated through the update processing with traveling of the vehicle designates a value of a more appropriate action variable according to the state of the vehicle compared to initial data before traveling of the vehicle is started. For this reason, according to the first aspect, the relationship definition data updated through the update processing with traveling of the vehicle is set as the post-treatment data, whereby it is possible to set a value of a more appropriate action variable according to the state of the vehicle after the function recovery treatment based on the relationship definition data after the switching processing compared to when initial data before traveling of the vehicle is started is set as the post-treatment data.

In the first aspect, the processor may be configured to execute past data maintenance processing of bringing the relationship definition data, which is updated through the update processing until a predetermined condition is established and avoids update through the update processing after the predetermined condition is established, into a state stored in the memory in addition to the relationship definition data updated through the update processing. The switching processing may include processing of using the relationship definition data maintained in a state stored in the memory through the past data maintenance processing as the post-treatment data.

According to the first aspect, the past data maintenance processing is executed, whereby it is possible to maintain the relationship definition data having a small degree of update according to deterioration or the like of a component in the vehicle as processing for post-treatment, and consequently, it is possible to use the relationship definition data as the post-treatment data.

In the first aspect, the processor may be configured to execute post-treatment data request processing of transmitting a signal for requesting the post-treatment data when the execution of the function recovery treatment is detected through the detection processing and post-treatment data reception processing of receiving the transmitted post-treatment data as a result of the post-treatment data request processing. The switching processing may include processing of switching the relationship definition data for use in the operation processing to the received post-treatment data.

According to the first aspect, the post-treatment data request processing and the post-treatment data reception processing are executed, whereby it is possible to obtain the post-treatment data even though the post-treatment data is not held in the control device.

A second aspect of the disclosure relates to a vehicle control system. The vehicle control system includes a memory and a processor. The memory is configured to store relationship definition data that defines a relationship between a state of a vehicle and an action variable, which is a variable relating to an operation of electronic equipment in the vehicle. The processor includes a first processor mounted in the vehicle and a second processor different from an in-vehicle device. The first processor is configured to execute acquisition processing of acquiring a detection value of a sensor that is configured to detect the state of the vehicle. The processor is configured to execute operation processing of operating the electronic equipment based on a value of the action variable determined by the detection value acquired through the acquisition processing and the relationship definition data. The first processor is configured to execute detection processing of detecting that function recovery treatment of a component having an influence on the state of the vehicle resulting from the operation in the operation processing among components in the vehicle is executed. The second processor is configured to, when the execution of the function recovery treatment is detected through the detection processing, execute post-treatment data transmission processing of transmitting post-treatment data that is data a predetermined period before the execution of the function recovery treatment. The first processor may be configured to execute post-treatment data reception processing of receiving data transmitted through the post-treatment data transmission processing.

According to the second aspect, the second processor different from the in-vehicle device executes the post-treatment data transmission processing, whereby it is possible to obtain the post-treatment data even though the post-treatment data is not held in the first processor. The second processor being different from the in-vehicle device means that the second processor is not the in-vehicle device.

In the second aspect, the first processor may be configured to execute the detection processing and post-treatment data request processing of transmitting a signal for requesting the post-treatment data when the execution of the function recovery treatment is detected through the detection processing.

According to the second aspect, the post-treatment data request processing and the post-treatment data reception processing are executed, whereby it is possible to obtain the post-treatment data even though the post-treatment data is not held in the first processor.

In the second aspect, the post-treatment data transmission processing may include processing of transmitting, as the post-treatment data, the relationship definition data in a vehicle in which a degree of deterioration of the component is lower than the vehicle in which the function recovery treatment is executed.

According to the second aspect, the relationship definition data in the vehicle, in which the degree of deterioration of the component is low, is regarded as data the predetermined period before the execution of the function recovery treatment, and data is used as the post-treatment data. With this, it is possible to set, as the post-treatment data, the relationship definition data that is updated to a certain level through reinforcement learning with actual traveling while deterioration of the component does not progress compared to when initial data before traveling of the vehicle out of the relationship definition data is set as the post-treatment data.

In the second aspect, the first processor may be configured to execute the update processing.

A third aspect of the disclosure relates to a method for controlling a vehicle. The vehicle includes a memory, and a processor. The memory is configured to store relationship definition data that defines a relationship between a state of a vehicle and an action variable, which is a variable relating to an operation of electronic equipment in the vehicle. The method includes: executing, by the processor, acquisition processing of acquiring a detection value of a sensor that is configured to detect the state of the vehicle; executing, by the processor, operation processing of operating the electronic equipment based on a value of the action variable determined by the detection value acquired through the acquisition processing and the relationship definition data; executing, by the processor, reward calculation processing of providing, based on the detection value acquired through the acquisition processing, a greater reward when a characteristic of the vehicle satisfies a criterion than when the characteristic of the vehicle does not satisfy the criterion; executing, by the processor, update processing of updating the relationship definition data with the state of the vehicle based on the detection value acquired through the acquisition processing, the value of the action variable used for the operation of the electronic equipment, and the reward corresponding to the operation as inputs to update mapping determined in advance; executing, by the processor, detection processing of detecting that function recovery treatment of a component having an influence on the state of the vehicle resulting from the operation in the operation processing among components in the vehicle is executed; executing, by the processor, switching processing of, when the execution of the function recovery treatment is detected through the detection processing, switching the relationship definition data for use in the operation processing to post-treatment data that is data a predetermined period before the execution of the function recovery treatment; and based on the update mapping, outputting, by the processor, the relationship definition data updated to increase an expected return on the reward when the electronic equipment is operated in compliance with the relationship definition data.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
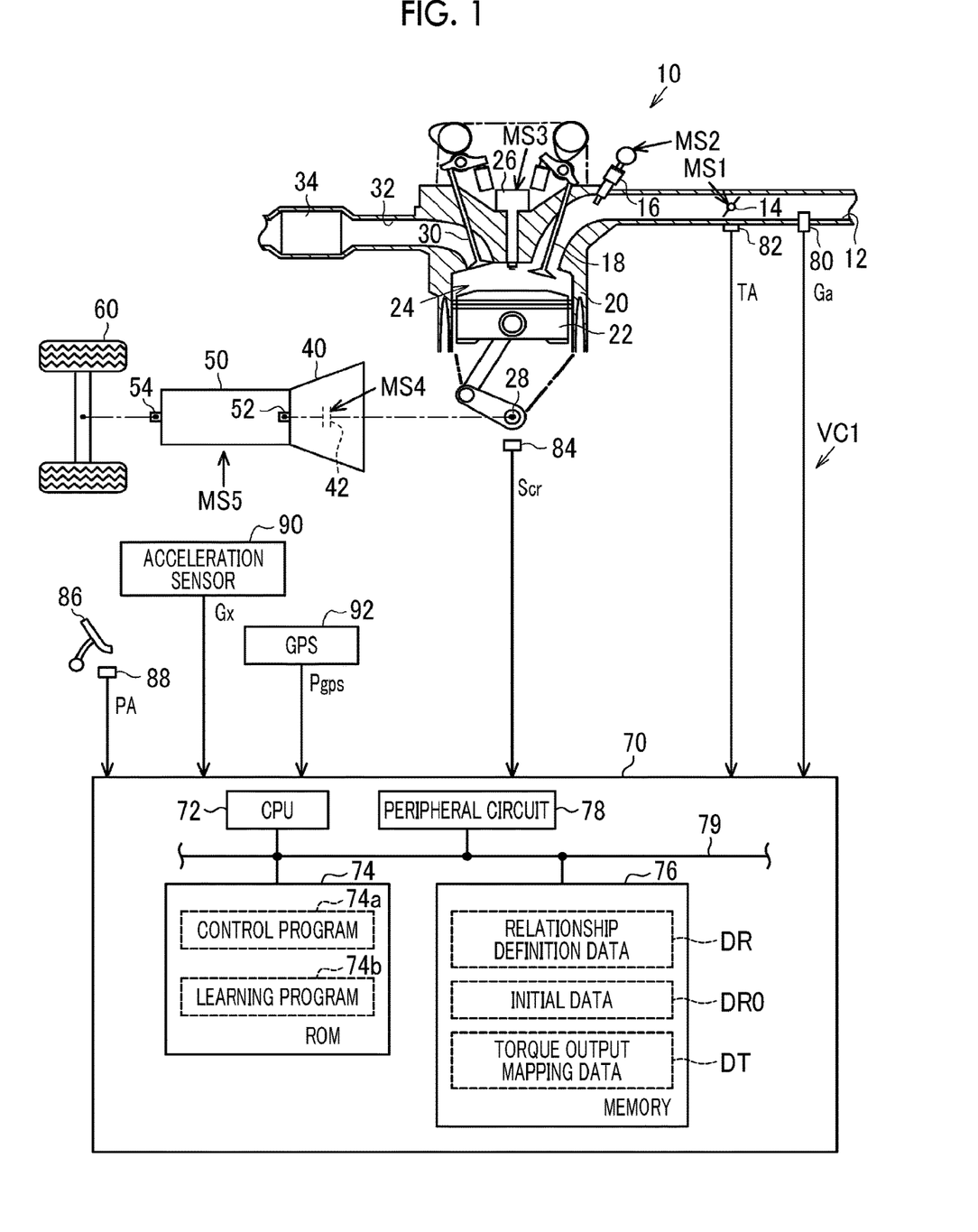
FIG. 1 is a diagram showing a control device and a drive system according to a first embodiment.

Hereinafter, a first embodiment of a vehicle control device will be described referring to the drawings. FIG. 1 shows the configuration of a drive system and a control device of a vehicle VC1 according to the embodiment.

As shown in FIG. 1, in an intake passage 12 of an internal combustion engine 10, a throttle valve 14 and a fuel injection valve 16 are provided in order from an upstream side, and air sucked into the intake passage 12 or fuel injected from the fuel injection valve 16 flows into a combustion chamber 24 partitioned by a cylinder 20 and a piston 22 when an intake valve 18 is opened. In the combustion chamber 24, an air-fuel mixture of fuel and air is supplied for combustion with spark discharge of an ignition device 26, and energy generated by combustion is converted into rotational energy of a crankshaft 28 through the piston 22. The air-fuel mixture supplied for combustion is discharged as exhaust gas to an exhaust passage 32 when an exhaust valve 30 is opened. In the exhaust passage 32, a catalyst 34 as a post-processing device that cleans exhaust gas.

An input shaft 52 of a transmission 50 is mechanically coupled to the crankshaft 28 through a torque converter 40 including a lockup clutch 42. The transmission 50 is a device that varies a gear ratio as a ratio of a rotation speed of the input shaft 52 and a rotation speed of an output shaft 54. Drive wheels 60 are mechanically coupled to the output shaft 54.

A control device 70 adapts the internal combustion engine 10 as a control target and operates an operating unit of the internal combustion engine 10, such as the throttle valve 14, the fuel injection valve 16, or the ignition device 26, to control torque, an exhaust gas component ratio, or the like that is a control amount of the internal combustion engine. The control device 70 also adapts the torque converter 40 as a control target and operates the lockup clutch 42 to control an engagement state of the lockup clutch 42. The control device 70 also adapts the transmission 50 as a control target and operates the transmission 50 to control the gear ratio as a control amount of the transmission. In FIG. 1, respective operation signals MS1 to MS5 of the throttle valve 14, the fuel injection valve 16, the ignition device 26, the lockup clutch 42, and the transmission 50 are described.

The control device 70 refers to an intake air amount Ga detected by an air flowmeter 80, an opening degree (throttle valve opening degree TA) of the throttle valve 14 detected by a throttle sensor 82, and an output signal Scr of a crank angle sensor 84 to control the control amount. The control device 70 also refers to a depression amount (accelerator operation amount PA) of an accelerator pedal 86 detected by an accelerator sensor 88 and an acceleration Gx in a front-rear direction of the vehicle VC1 detected by an acceleration sensor 90. The control device 70 also refers to position data Pgps from a global positioning system (GPS 92).

The control device 70 includes a CPU 72, a ROM 74, an electrically rewritable nonvolatile memory (memory 76), and a peripheral circuit 78, and the units are communicable through a local network 79. Here, the peripheral circuit 78 includes a circuit that generates a clock signal for defining an internal operation, a power supply circuit, a reset circuit, and the like.

The ROM 74 stores a control program 74a and a learning program 74b. On the other hand, the memory 76 stores relationship definition data DR that defines a relationship between the accelerator operation amount PA, and a command value (throttle valve opening degree command value TA*) of the throttle valve opening degree TA and a retardation amount aop of the ignition device 26, and initial data DR0 of the relationship definition data DR. Here, the retardation amount aop is a retardation amount with respect to a reference ignition timing determined in advance, and the reference ignition timing is a timing on a retardation side out of an MBT ignition timing and a knock limit point. The MBT ignition timing is an ignition timing (maximum torque ignition timing) at which maximum torque is obtained. The knock limit point is an advancement limit value of an ignition timing at which knocking can be restrained within an allowable level under assumed best conditions when high-octane-number fuel having a high knock limit is used. The memory 76 stores torque output mapping data DT. Torque output mapping defined by the torque output mapping data DT is mapping for outputting torque Trq with a rotation speed NE of the crankshaft 28, filling efficiency and an ignition timing as inputs.

Figure 2:
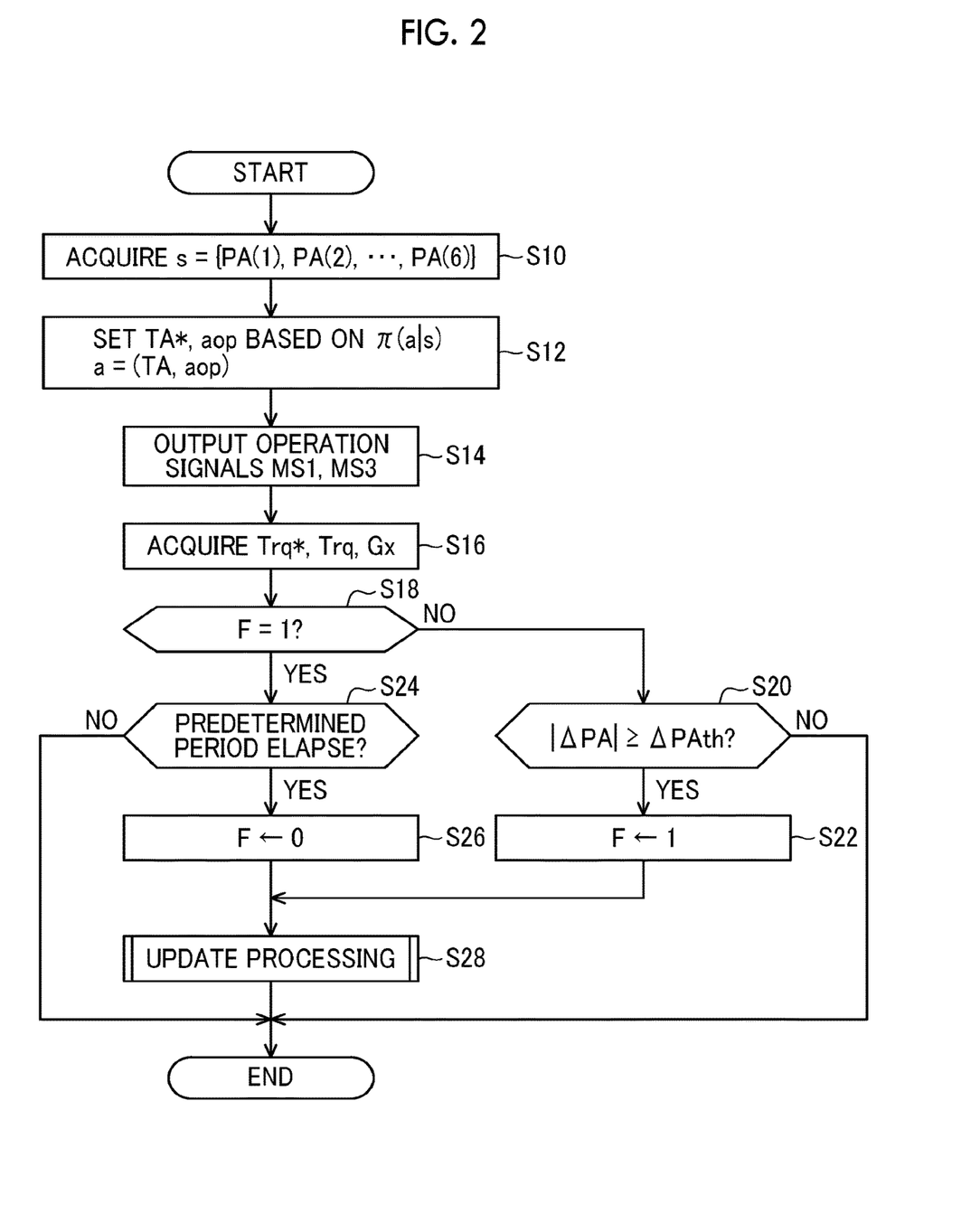
FIG. 2 is a flowchart showing a procedure of processing that is executed by the control device according to the embodiment.

FIG. 2 shows a procedure of processing that is executed by the control device 70 according to the embodiment. The processing shown in FIG. 2 is implemented by the CPU 72 repeatedly executing the control program 74a and the learning program 74b stored in the ROM 74, for example, in a predetermined cycle. In the following description, the step number of the respective processing is represented by a number in front of which the character "S" is given.

In a series of processing shown in FIG. 2, the CPU 72 first acquires time-series data including six sampling values "PA(1), PA(2), . . . , PA(6)" of the accelerator operation amount PA as a state s (S10). Here, the sampling values constituting time-series data are sampled at different timings from one another. In the embodiment, time-series data is constituted of six sampling values adjacent to one another in time series when sampling is performed in a given sampling cycle.

Next, the CPU 72 sets an action a including the throttle valve opening degree command value TA* and the retardation amount aop according to the state s acquired through the processing of S10 in compliance with a policy π determined by the relationship definition data DR (S12).

In the embodiment, the relationship definition data DR is data that determines an action value function Q and the policy π. In the embodiment, the action value function Q is a function in a table format indicating a value of an expected return according to eight-dimensional independent variables of the state s and the action a. The policy π determines a rule to select an action a (greedy action) maximizing the action value function Q with the independent variable to be the given state s with priority and also to select another action a with a predetermined probability e when the state s is given.

In detail, in regard to the number of possible values of the independent variables of the action value function Q according to the embodiment, a part of all combinations of possible values of the state s and the action a is reduced by human knowledge or the like. That is, for example, determination is made that a situation in which one of adjacent two sampling values in the time-series data of the accelerator operation amount PA becomes a minimum value of the accelerator operation amount PA and the other sampling value becomes a maximum value does not result from a human operation on the accelerator pedal 86, and the action value function Q is not defined. In the embodiment, with the dimension reduction based on the human knowledge or the like, the possible values of the state s defining the action value function Q are limited to be equal to or less than the fourth power of 10, and more desirably, equal to or less than the third power of 10.

Next, the CPU 72 outputs the operation signal MS1 to the throttle valve 14 to operate the throttle valve opening degree TA and outputs the operation signal MS3 to the ignition device 26 to operate the ignition timing based on the set throttle valve opening degree command value TA* and retardation amount aop (S14). Here, in the embodiment, since feedback control of the throttle valve opening degree TA to the throttle valve opening degree command value TA* is illustrated, even though the throttle valve opening degree command value TA* is the same value, the operation signal MS1 may be different. For example, when known knocking control (KCS) or the like is performed, the ignition timing becomes a value resulting from feedback correction by the KCS on a value obtained by retarding the reference ignition timing by the retardation amount aop. Here, the reference ignition timing is set variably according to the rotation speed NE of the crankshaft 28 and the filling efficiency η by the CPU 72. The rotation speed NE is calculated based on the output signal Scr of the crank angle sensor 84 by the CPU 72. The filling efficiency η is calculated based on the rotation speed NE and the intake air amount Ga by the CPU 72.

Next, the CPU 72 acquires the torque Trq of the internal combustion engine 10, a torque command value Trq* to the internal combustion engine 10, and the acceleration Gx (S16). Here, the CPU 72 calculates the torque Trq by inputting the rotation speed NE, the filling efficiency 11, and the ignition timing to torque output mapping. The CPU 72 sets the torque command value Trq* according to the accelerator operation amount PA.

Next, the CPU 72 determines whether or not a transition flag F is "1" (S18). When the transition flag F is "1", this indicates that the internal combustion engine is in a transition operation, and when the transition flag F is "0", this indicates that the internal combustion engine is not in the transition operation. When determination is made that the transition flag F is "0" (S18: NO), the CPU 72 determines whether or not an absolute value of a change amount ΔPA per unit time of the accelerator operation amount PA is equal to or greater than a predetermined amount ΔPAth (S20). Here, the change amount ΔPA should be set to, for example, the difference between the latest accelerator operation amount PA at an execution timing of the processing of S20 and the accelerator operation amount PA before the same timing by the unit time.

When determination is made that the absolute value of the change amount ΔPA is equal to or greater than the predetermined amount ΔPAth (S20: YES), the CPU 72 substitutes "1" into the transition flag F (S22). In contrast, when determination is made that the transition flag F is "1" (S18: YES), the CPU 72 determines whether or not a predetermined period has elapsed after the execution timing of the processing of S22 (S24). Here, the predetermined period is set to a period until a state in which the absolute value of the change amount ΔPA per unit time of the accelerator operation amount PA becomes equal to or less than a specified amount smaller than the predetermined amount ΔPAth is continued for a predetermined time. When determination is made that the predetermined period has elapsed (S24: YES), the CPU 72 substitutes "0" into the transition flag F (S26).

Figure 3:
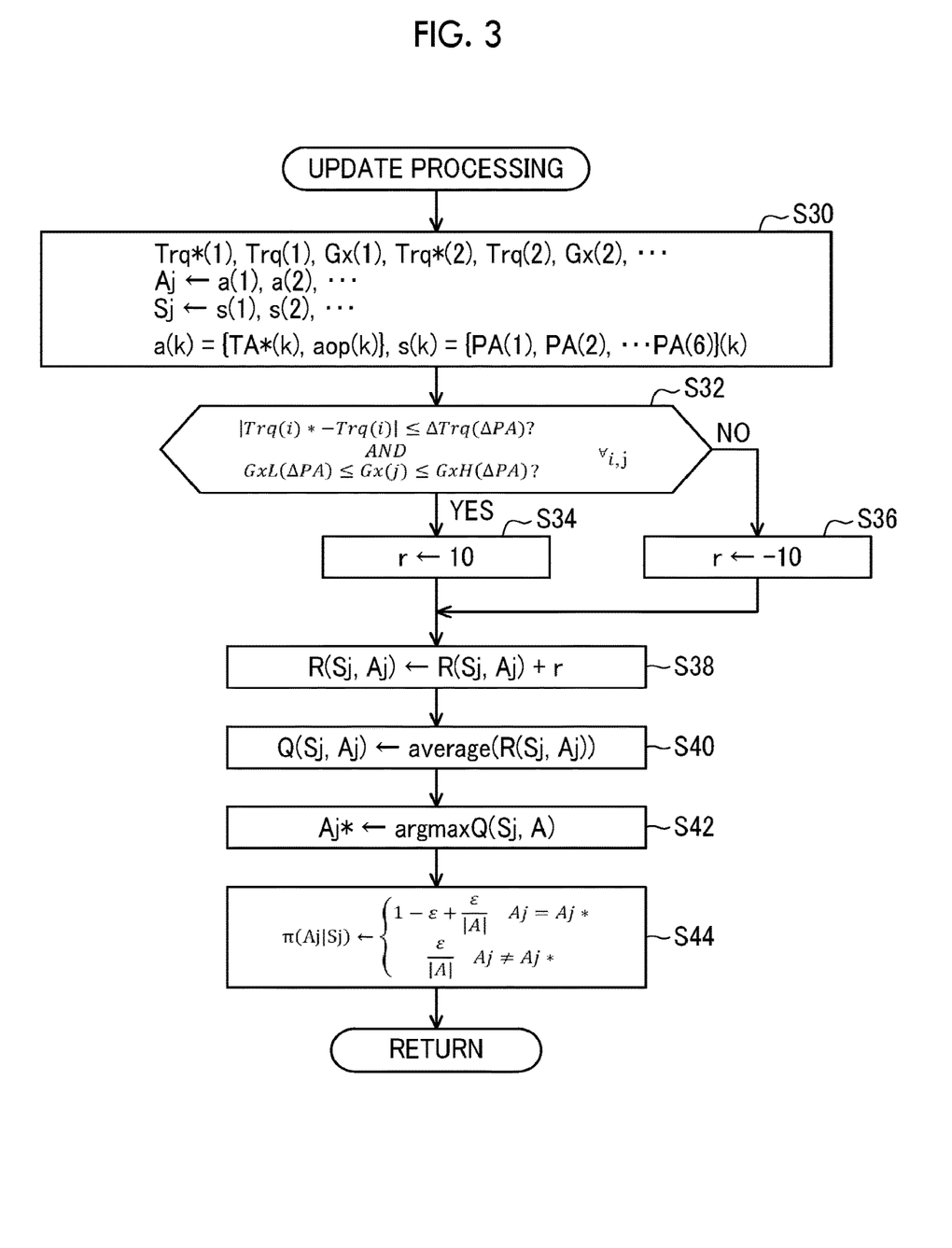
FIG. 3 is a flowchart showing a detailed procedure of processing that is executed by the control device according to the embodiment.

When the processing of S22 or S26 is completed, the CPU 72 determines that one episode is ended, and updates the action value function Q through reinforcement learning (S28). FIG. 3 shows the details of the processing of S28.

In a series of processing shown in FIG. 3, CPU 72 acquires time-series data including a set of three sampling values of the torque command value Trq*, the torque Trq, and the acceleration Gx in the last ended episode and time-series data of the state s and the action a (S30). Here, the last episode is a period during which the transition flag F is continuously "0" when the processing of S30 is executed next to the processing of S22, and is a period during which the transition flag F is continuously "1" when the processing of S30 is executed next to the processing of S26.

FIG. 3 shows that different numbers in parentheses are values of variables at different sampling timings. For example, a torque command value Trq*(1) and a torque command value Trq*(2) are different in sampling timing from each other. Time-series data of the action a belonging to the last episode is defined as an action set Aj, and time-series data of the state s belonging to the same episode is defined as a state set Sj.

Next, the CPU 72 determines whether or not a logical product of a condition (i) that an absolute value of the difference between any torque Trq and the torque command value Trq* belonging to the last episode is equal to or less than a specified amount ΔTrq and a condition (ii) that the acceleration Gx is equal to or greater than a lower limit value GxL and equal to or less than an upper limit value GxH is true (S32).

Here, the CPU 72 variably sets the specified amount ΔTrq with the change amount ΔPA per unit time of the accelerator operation amount PA at the time of a start of an episode. That is, the CPU 72 determines that an episode relates to a transition period based on the absolute value of the change amount ΔPA is large, and sets the specified amount ΔTrq to a greater value than an episode in a normal period.

The CPU 72 variably sets the lower limit value GxL with the change amount ΔPA of the accelerator operation amount PA at the time of the start of the episode. That is, when the episode relates to the transition period and the change amount ΔPA is positive, the CPU 72 sets the lower limit value GxL to a greater value than the episode in the normal period. When the episode relates to the transition period and the change amount ΔPA is negative, the CPU 72 sets the lower limit value GxL to a smaller value than the episode in the normal period.

The CPU 72 variably sets the upper limit value GxH with the change amount ΔPA per unit time of the accelerator operation amount PA at the time of the start of the episode. That is, when the episode relates to the transition period and the change amount ΔPA is positive, the CPU 72 sets the upper limit value GxH to a greater value than the episode in the normal period. When the episode relates to the transition period and the change amount ΔPA is negative, the CPU 72 sets the upper limit value GxH to a smaller value than the episode in the normal period.

When determination is made that the logical product is true (S32: YES), the CPU 72 substitutes "10" into a reward r (S34), and when determination is made that the logical product is false (S32: NO), the CPU 72 substitutes "−10" into the reward r (S36). When the processing of S34 or S36 is completed, the CPU 72 updates the relationship definition data DR stored in the memory 76 shown in FIG. 1. In the embodiment, an ε-soft on-policy type Monte Carlo method is used.

That is, the CPU 72 adds the reward r to each return R(Sj,Aj) determined by a set of each state read through the processing of S30 and a corresponding action (S38). Here, "R(Sj,Aj)" comprehensively represents a return R with one of the elements of the state set Sj as a state and one of the elements of the action set Aj as an action. Next, the return R(Sj,Aj) determined by the set of each state read through the processing of S30 and the corresponding action is averaged, and the averaged reward is substituted into the corresponding action value function Q(Sj,Aj) (S40). Here, averaging should be processing of dividing the return R calculated through the processing of S38 by a number obtained by adding a predetermined number to the number of times in which the processing of S38 is executed. An initial value of the return R should be an initial value of the corresponding action value function Q.

Next, the CPU 72 substitutes, into an action Aj*, an action that is a set of the throttle valve opening degree command value TA* and the retardation amount aop when the corresponding action value function Q(Sj,A) has a maximum value on each state read through the processing of S30 (S42). Here, "A" indicates any possible action. Although the action Aj* becomes an individual value according to the type of the state read through the processing of S30, here, the action Aj* is simplified in expression and described by the same symbol.

Next, the CPU 72 updates a corresponding policy π(Aj|Sj) on each state read through the processing of S30 (S44). That is, when the total number of actions is "|A|", a selection probability of the action Aj* selected through S42 is "1−ε+ ε/|A|". A selection probability of each of "|A|−1" actions other than the action Aj* is "ε/|A|". Since the processing of S44 is processing based on the action value function Q updated through the processing of S40, with this, the relationship definition data DR that defines the relationship between the state s and the action a is updated so as to increase the return R.

When the processing of S44 is completed, the CPU 72 ends a series of processing shown in FIG. 3 once. Returning to FIG. 2, when the processing of S28 is completed or when negative determination is made in the processing of S20 or S24, the CPU 72 ends a series of processing shown in FIG. 2 once. The processing of S10 to S26 is implemented by the CPU 72 executing the control program 74*a*, and the processing of S28 is implemented by the CPU 72 executing the learning program 74*b*. The relationship definition data DR at the time of shipment of the vehicle VC1 is the same as the initial data DR0. The initial data DR0 is data that is learned in advance through the same processing as the processing shown in FIG. 2 while a simulation of traveling of the vehicle is performed by a test bench or the like.

Figure 4:
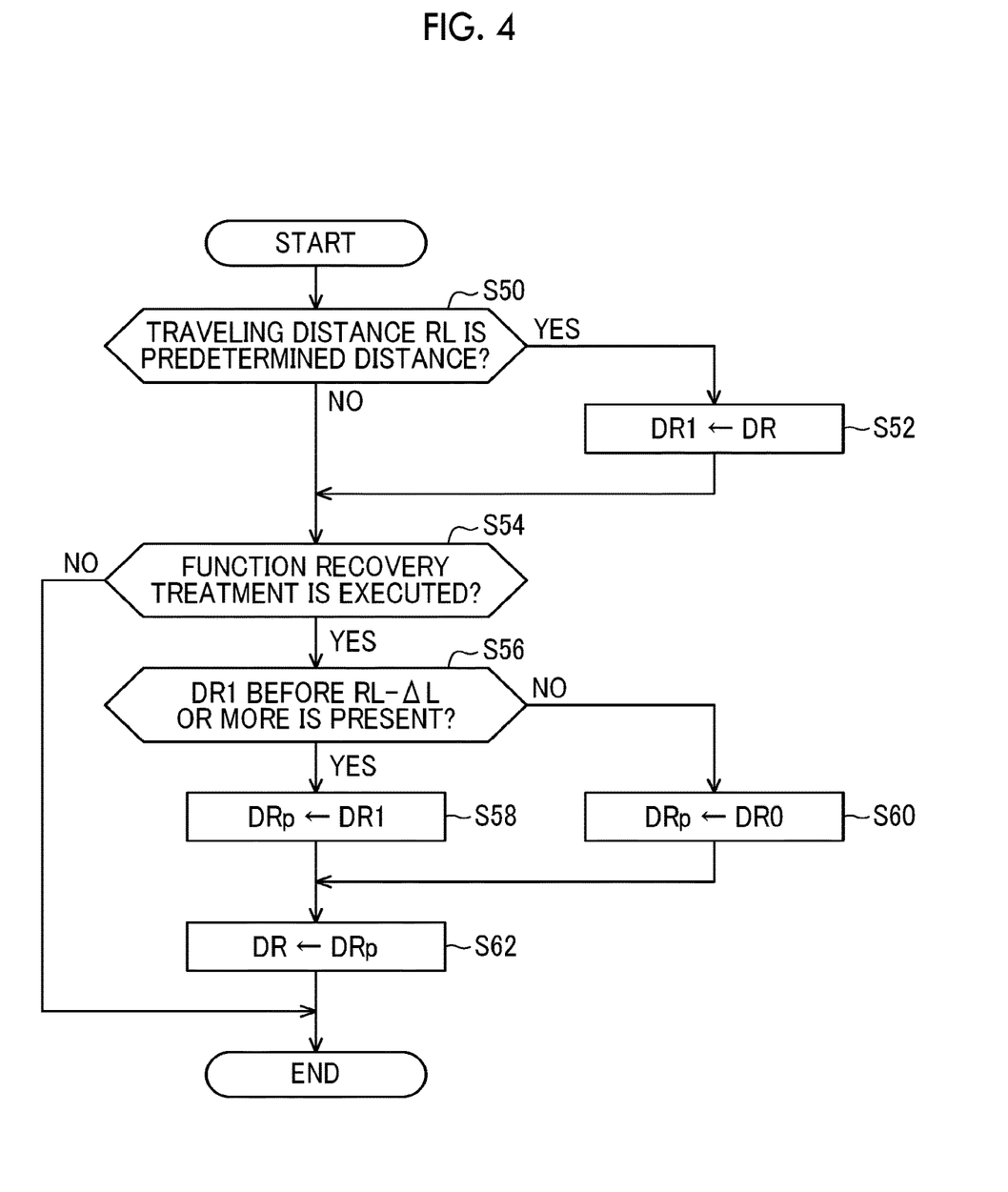
FIG. 4 is a flowchart showing a procedure of processing that is executed by the control device according to the embodiment.

FIG. 4 shows a procedure of processing that is executed by the control device 70 according to the embodiment. The processing shown in FIG. 4 is implemented by the CPU 72 repeatedly executing the learning program 74*b* stored in the ROM 74, for example, in a predetermined cycle.

In a series of processing shown in FIG. 4, the CPU 72 first determines whether or not a traveling distance RL of the vehicle VC1 becomes a predetermined distance (S50). Here, the predetermined distance is set to, for example, a plurality of distances represented by multiples of a predetermined amount, such as 10,000 km, 20,000 km, 30,000 km, . . . . When determination is made that the traveling distance is the predetermined distance (S50: YES), the CPU 72 stores the relationship definition data DR at this point in the memory 76 as updated data DR1 (S52). When the predetermined amount is set to "10,000 km", when the traveling distance RL becomes 20,000 km, two different pieces of data are stored in the memory 76 as the updated data DR1. That is, each time determination is made that the traveling distance RL is the predetermined distance, the relationship definition data DR at this point is newly stored in the memory 76 as updated data DR1, and the updated data DR1 increases.

When the processing of S52 is completed or when negative determination is made in the processing of S50, the CPU 72 determines whether or not function recovery treatment is executed (S54). In the embodiment, description will be provided assuming that, when the function recovery treatment of a component mounted in the vehicle VC1 accompanied by maintenance of the vehicle VC1 is executed, a signal indicating the effect that the function recovery treatment is executed is input from a scan tool to the control device 70. For this reason, when the signal indicating the effect that the function recovery treatment is executed is input, the CPU 72 determines that the function recovery treatment is executed.

When determination is made that the function recovery treatment is executed (S54: YES), the CPU 72 determines whether or not the updated data DR1 is present when the traveling distance is shorter by a predetermined amount ΔL or more than the traveling distance RL (S56). Then, when determination is made that the updated data DR1 is present (S56: YES), the CPU 72 substitutes the updated data DR1 into post-treatment data DRp (S58). When a plurality of pieces of data for which affirmative determination is made in the processing of S56 is stored in the memory 76 as the updated data DR1, the CPU 72 substitutes, into the post-treatment data DRp, data when the traveling distance RL is the longest. In contrast, when determination is made that the updated data DR1 is not present (S56: NO), the CPU 72 substitutes the initial data DR0 into the post-treatment data DRp (S60).

When the processing of S58 or S60 is completed, the CPU 72 rewrites the relationship definition data DR for use in the processing of S12 with the post-treatment data DRp (S62). When the processing of S62 is completed or when negative determination is made in the processing of S54, the CPU 72 ends a series of processing shown in FIG. 4 once.

Here, the operation and the effects of the embodiment will be described. The CPU 72 acquires the time-series data of the accelerator operation amount PA according to a user's operation on the accelerator pedal 86 and sets the action a including the throttle valve opening degree command value TA* and the retardation amount aop in compliance with the policy π. Here, the CPU 72 basically selects the action a maximizing the expected return based on the action value function Q defined in the relationship definition data DR. Note that the CPU 72 explores the action a maximizing the expected return by selecting an action other than the action a maximizing the expected return with the predetermined probability ε. With this, the relationship definition data DR can be updated through reinforcement learning with user's driving of the vehicle VC1. Accordingly, the throttle valve opening degree command value TA* and the retardation amount aop according to the accelerator operation amount PA can be set to appropriate values in traveling of the vehicle VC1 while man-hours of the expert are not excessively increased.

In this manner, the relationship definition data DR that is the same as the initial data DR0 at the time of shipment of the vehicle VC1 is updated with traveling of the vehicle VC1. Here, for example, even though the throttle valve opening degree TA is the same, when deposits are deposited on the throttle valve 14 or the intake passage 12, since a flow passage cross-sectional area of the intake passage 12 becomes small, the intake air amount Ga becomes small. For this reason, there is a possibility that the throttle valve opening degree command value TA* maximizing the expected return according to the time-series data of the accelerator operation amount PA defined by the relationship definition data DR is updated to compensate for a change in flow passage cross-sectional area of the intake passage 12 due to deposition of the deposits on the throttle valve 14. In this way, when the relationship definition data DR is learned to compensate for aging deterioration of a component of the vehicle VC1, thereafter, when component replacement or cleaning is performed with maintenance, and accordingly, the function recovery treatment of the component of the vehicle VC1 is executed, there is a possibility that the relationship definition data DR does not become appropriate data in determining an action making an expected return large.

Accordingly, each time the traveling distance RL is increased by a predetermined amount, the CPU 72 stores the relationship definition data DR at this point as the updated data DR1. Then, when determination is made that the function recovery treatment accompanied by maintenance is executed, and when the updated data DR1 when the traveling distance is shorter by the predetermined amount ΔL or more than the traveling distance RL is present, the CPU 72 sets the updated data DR1 as the post-treatment data DRp and rewrites the relationship definition data DR for use in setting the throttle valve opening degree command value TA* and the retardation amount aop with the post-treatment data DRp. Here, the updated data DR1 is data updated with actual traveling of the vehicle VC1 with respect to initial data DR0, which is the relationship definition data DR at the time of shipment of the vehicle VC1. Besides, since the updated data DR1 is the relationship definition data DR at the traveling distance RL shorter by the predetermined distance ΔL or more than when the function recovery treatment is executed, the updated data DR1 is considered to be data having little influence of deterioration or the like of a component at the time of the execution of the function recovery treatment. For this reason, the updated data DR1 is updated, whereby it is possible to make the relationship definition data DR appropriate for the vehicle VC1 after the function recovery treatment.

According to the embodiment described above, the following advantageous effects are further obtained.

(1) When the updated data DR1 at the traveling distance RL shorter by the predetermined distance ΔL or more than when the function recovery treatment is executed is not present, the initial data DR0 is set as the post-treatment data DRp, and the relationship definition data DR is rewritten with the post-treatment data DRp. The initial data DR0 is data that is not updated to compensate for deterioration of a component. For this reason, the relationship definition data DR is rewritten with the initial data DR0, whereby it is possible to operate the throttle valve 14 or the ignition device 26 using data more appropriate for the operation of the throttle valve 14 or the ignition device 26 after the function recovery treatment compared to when the relationship definition data DR before the function recovery treatment is continuously used as it is even after the function recovery treatment is executed.

(2) The time-series data of the accelerator operation amount PA is included in the independent variable of the action value function Q. With this, the value of the action a can be finely adjusted for various changes in accelerator operation amount PA compared to when solely a single sampling value related to the accelerator operation amount PA is used as an independent variable.

(3) The throttle valve opening degree command value TA* itself is included in the independent variables of the action value function Q. With this, for example, the degree of freedom of exploration through reinforcement learning is easily increased compared to when a parameter or the like of a model expression modeling the behavior of the throttle valve opening degree command value TA* is used as an independent variable relating to the throttle valve opening degree.

Second Embodiment

Hereinafter, a second embodiment will be described referring to the drawings focusing on differences from the first embodiment.

Figure 5:
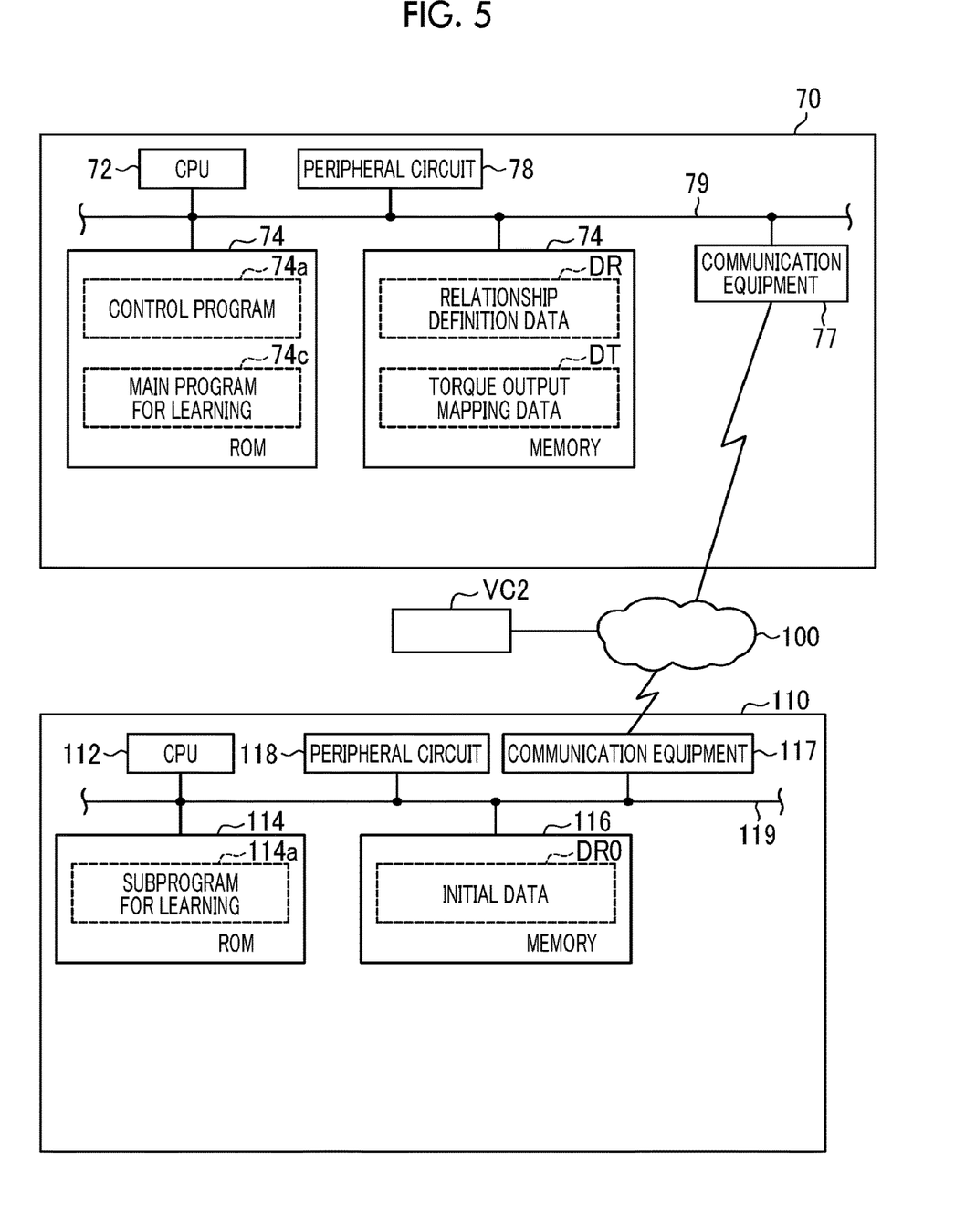
FIG. 5 is a diagram showing the configuration of a vehicle control system according to a second embodiment.

FIG. 5 shows the configuration of a control system that executes reinforcement learning in the embodiment. In FIG. 5, members corresponding to the members shown in FIG. 1 are represented by the same reference numerals for convenience.

A main program 74c for learning is stored in the ROM 74 in the vehicle VC1 shown in FIG. 5 in addition to the control program 74a. The memory 76 in the vehicle VC1 stores the torque output mapping data DT or the relationship definition data DR, but does not store the initial data DR0. The control device 70 includes communication equipment 77. The communication equipment 77 is equipment for communication with a data analysis center 110 through an external network 100 of the vehicle VC1.

The data analysis center 110 analyzes data transmitted from a plurality of vehicles VC1, VC2, . . . . The data analysis center 110 comprises a CPU 112, a ROM 114, an electrically rewritable nonvolatile memory (memory 116), a peripheral circuit 118, and communication equipment 117, and the units are communicable through a local network 119. A subprogram 114a for learning is stored in the ROM 114. The initial data DR0 is stored in the memory 116.

Figure 6:
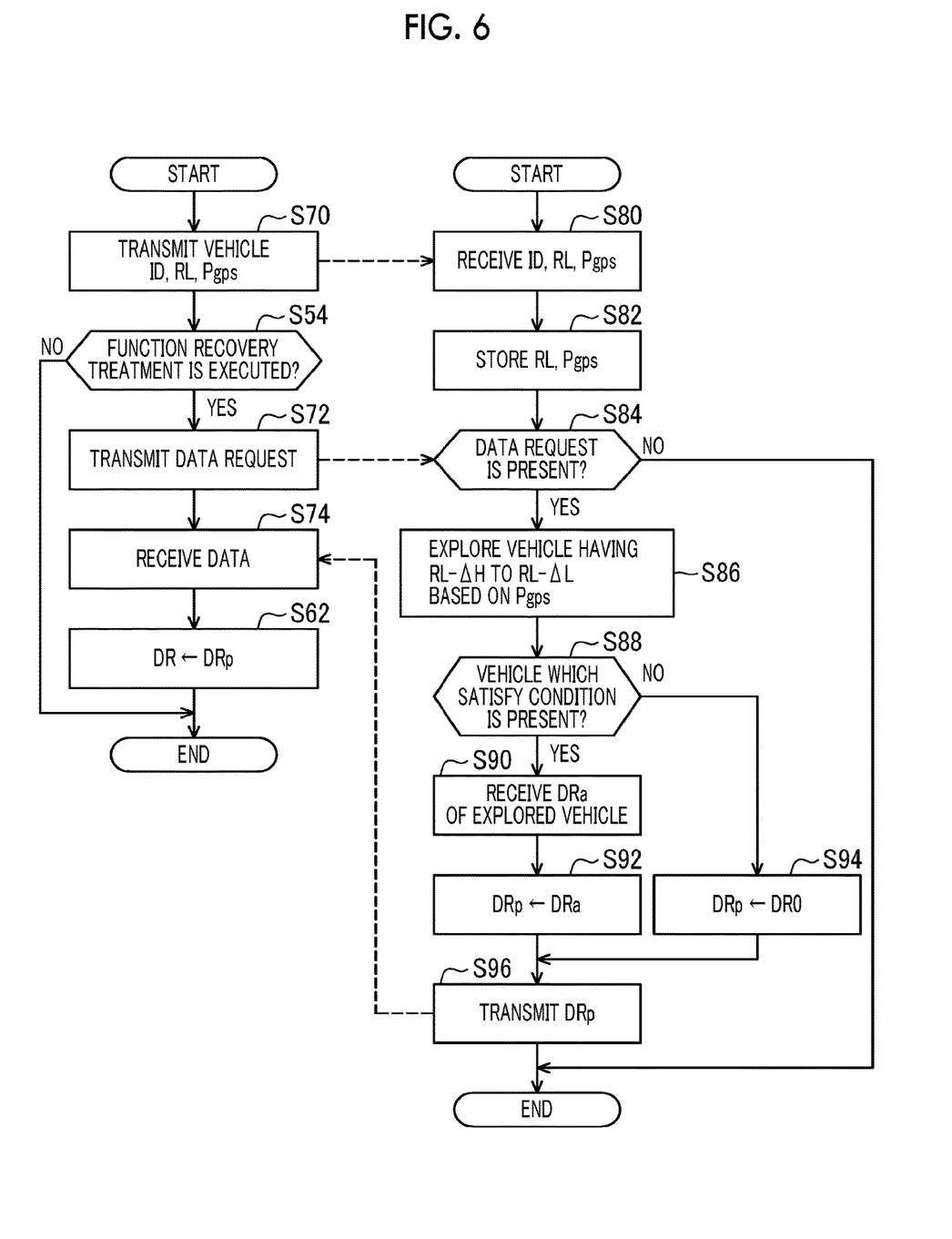
FIG. 6 is a flowchart showing a procedure of processing that is executed by the vehicle control system.

FIG. 6 shows a processing procedure that deals with function recovery treatment according to the embodiment. Processing shown in a flow on the left side of FIG. 6 is implemented by the CPU 72 executing the main program 74c for learning stored in the ROM 74 shown in FIG. 5. Processing shown in a flow on the right side of FIG. 6 is implemented by the CPU 112 executing the subprogram 114a for learning stored in the ROM 114. Processing in FIG. 6 corresponding to the processing shown in FIG. 4 is represented by the same step numbers for convenience. In the following description, the processing shown in FIG. 6 will be described in time series.

In a series of processing shown in a flow on the left side of FIG. 6, the CPU 72 first operates the communication equipment 77 transmit identification information ID, the traveling distance RL, and position data Pgps of the vehicle VC1 (S70).

In contrast, as shown in the flow on the right side of FIG. 6, the CPU 112 receives the identification information ID, the traveling distance RL, and the position data Pgps (S80). Then, the CPU 112 updates the traveling distance RL and the position data Pgps associated with the identification information ID stored in the memory 116 to values received through the processing of S80 (S82).

On the other hand, as shown in the flow on the left side of FIG. 6, the CPU 72 executes the processing of S54, and when affirmative determination is made, operates the communication equipment 77 to transmit a signal for requesting the post-treatment data DRp appropriate as the relationship definition data DR for use in the processing of S12 (S72).

In contrast, as shown in the flow on the right side of FIG. 6, the CPU 112 determines whether or not there is a request of the post-treatment data DRp (S84). Then, when determination is made that there is the request of the post-treatment data DRp (S84: YES), the CPU 112 searches for a vehicle that is close in position to the vehicle VC1, which has transmitted the signal for requesting the post-treatment data DRp, and has a short traveling distance (S86). Here, a condition that the vehicle is close in position is that a vehicle is at a predetermined distance or less from the vehicle VC1, which has transmitted the signal for requesting the post-treatment data DRp, based on the position data Pgps of each vehicle stored through the processing of S82. A vehicle of which the traveling distance is shorter than the vehicle VC1, which has transmitted the signal for requesting the post-treatment data DRp, is a vehicle of which the traveling distance is shorter by the predetermined amount ΔL or more than the traveling distance RL of the vehicle VC1 and has a difference from the traveling distance RL of the vehicle VC1 equal to or less than a specified amount ΔH.

Here, the reason that the vehicle at the predetermined distance or less from the vehicle VC1 is searched is because there is a concern that the relationship definition data DR of a vehicle at an extremely large distance from the vehicle VC1 is not appropriate data in making the expected return large for the vehicle VC1 due to a difference in environment, or the like. The condition that a vehicle has the traveling distance RL shorter by the predetermined amount ΔL or more than the traveling distance RL of the vehicle VC1, but does not have the difference equal to or greater than the specified amount ΔH is a setting for specifying a vehicle approximate to the state before component deterioration of the vehicle VC1.

When determination is made that the vehicle, which satisfies the condition, is present (S88: YES), the CPU 112 operates the communication equipment 117 to prompt the vehicle, which satisfies the condition, to transmit the relationship definition data DR and receives the relationship definition data DR as non-host vehicle definition data DRa (S90). Next, the CPU 72 substitutes the non-host vehicle definition data DRa into the post-treatment data DRp (S92). In contrast, when determination is made that the vehicle, which satisfies the condition, is not present (S88: NO), the CPU 72 substitutes the initial data DR0 into the post-treatment data DRp (S94). When the processing of S92 or S94 is completed, the CPU 112 operates the communication equipment 117 to transmit the post-treatment data DRp to the vehicle VC1, which sends the request (S96). When the processing of S96 is completed or when negative determination is made in the processing of S84, the CPU 112 ends a series of processing shown in the flow on the right side of FIG. 6 once.

In contrast, as shown in the flow on the left side of FIG. 6, the CPU 72 receives the transmitted post-treatment data DRp (S74), and executes the processing of S62. When the processing of S62 is completed or when negative determination is made in the processing of S54, the CPU 72 ends a series of processing shown in the flow on the left side of FIG. 6 once.

The CPU 72 and the ROM 74 are an example of a processor, and the memory 76 is an example of a memory. The processing of S10 or S16 is an example of acquisition processing, and the processing of S14 is an example of operation processing. The processing of S32 to S36 is an example of reward calculation processing, and the processing of S38 to S44 is an example of update processing. The processing of S54 is an example of detection processing, and the processing of S62 is an example of switching processing. Mapping defined by a command for executing the processing of S38 to S44 in the learning program 74b, is an example of update mapping. An example of past data maintenance processing is the processing of S52. An example of post-treatment data request processing is the processing of S72. An example of post-treatment data reception processing is the processing of S74. The CPU 72 and the ROM 74 are an example of a first processor. The CPU 112 and the ROM 114 are an example of a second processor. The processing of S96 is an example of post-treatment data transmission processing, and the processing of S74 is an example of post-treatment data reception processing.

Other Embodiments

The embodiment can be modified as follows. The embodiment and the following modification examples can be combined as long as no technical contradiction arises.

Detection Processing

In the above-described embodiments, although the signal indicating the effect that the function recovery treatment is executed is input from the scan tool to the control device 70 in a state in which the scan tool is connected to the control device 70, the control device 70 detects the effect, the detection processing is not limited thereto. For example, when the function recovery treatment is executed at a repair shop or the like, the effect may be notified to the data analysis center 110 through the network 100. Even in this case, processing conforming to the processing of S80, S82, and S86 to S96 in the flow on the right side of FIG. 6 is executed in the data analysis center 110, whereby the post-treatment data DRp can be transmitted to the control device 70.

The detection processing is not limited to the detection processing that is executed by any one of the control device 70 and the data analysis center 110. For example, as described in a column "Vehicle Control System", when the vehicle control system includes a portable terminal, the portable terminal may execute the detection processing. Here, when the vehicle control system is constituted of the control device 70, the portable terminal, and the data analysis center 110, after the portable terminal may execute the detection processing, the signal for requesting the post-treatment data DRp may be transmitted to the data analysis center 110.

The detection processing is not limited to the processing of directly detecting the signal from the repair shop or the like. For example, when the signal indicating the effect that the function recovery treatment is executed is transmitted to the portable terminal, and the signal indicating the effect is further transmitted from the portable terminal to the control device 70, processing in which the control device 70 receives the signal from the portable terminal may be applied as the detection processing.

Past Data Maintenance Processing

In the above-described embodiments, although, each time the traveling distance RL is increased by the predetermined distance, the relationship definition data DR at this point is stored as the updated data DR1, the disclosure is not limited thereto. For example, an amount of deposition of deposits around the throttle valve 14 may be quantified by an average value of intake air amount Ga per "1%" when a fully open state of the throttle valve opening degree TA is 100%, and when the average value is changed by a specified value, the relationship definition data DR at this point may be set as the updated data DR1. Here, the specified value may be set to an upper limit value at which an influence on the intake air amount Ga is negligible.

Post-Treatment Data Transmission Processing

Data needed during the execution of the switching processing in the control device 70 is not limited solely to the post-treatment data DRp. For example, as described in the column "Detection Processing", when the signal indicating the effect that the function recovery treatment is executed is transmitted from the repair shop to the data analysis center 110 through the network 100, data indicating the effect and the post-treatment data DRp may be transmitted from the data analysis center 110 to the control device 70.

The processing of S86 to S92 may be deleted, and the post-treatment data DRp that is transmitted from the data analysis center 110 to the control device 70 may be constantly set to the initial data DR0. Alternatively, for example, processing conforming to the processing of S28 of FIG. 2 and the processing of S50, S52, and S56 to S62 of FIG. 4 may be executed by the data analysis center 110, and the post-treatment data DRp generated through the processing of S62 may be transmitted to the control device 70.

Action Variable

In the above-described embodiments, although the throttle valve opening degree command value TA* is exemplified as the variable relating to the opening degree of the throttle valve as the action variable, the disclosure is not limited thereto. For example, the responsiveness of the throttle valve opening degree command value TA* to the accelerator operation amount PA may be expressed by a wasteful time and a second-order lag filter, and three variables in total including the wasteful time and two variables defining the second-order lag filter may be used as the variable relating to the opening degree of the throttle valve. In this case, it is desirable that a state variable is a change amount per unit time of the accelerator operation amount PA instead of the time-series data of the accelerator operation amount PA.

In the above-described embodiments, although the retardation amount aop is exemplified as the variable relating to the ignition timing as the action variable, the disclosure is not limited thereto. For example, the ignition timing itself to be corrected through the KCS may be used.

In the above-described embodiments, although the variable relating to the opening degree of the throttle valve and the variable relating to the ignition timing are exemplified as the action variable, the disclosure is not limited thereto. For example, a fuel injection amount may be used in addition to the variable relating to the opening degree of the throttle valve and the variable relating to the ignition timing. In regards to the three values, solely the variable relating to the opening degree of the throttle valve and the fuel injection amount may be employed as the action variable, or solely the variable relating to the ignition timing and the fuel injection amount may be employed. In regards to the three values, solely one value may be employed as the action variable.

As described in a column "Internal Combustion Engine", in a compression ignition type internal combustion engine, a variable relating to an injection amount may be used instead of the variable relating to the opening degree of the throttle valve, and a variable relating to an injection timing may be used instead of the variable relating to the ignition timing. It is desirable that a variable relating to the number of injections in one combustion cycle or a variable relating to a time interval between an end timing of one of two adjacent fuel injections in time series and a start timing of the other fuel injection for one cylinder in one combustion cycle are added in addition to the variable relating to the injection timing.

For example, when the transmission 50 is a stepped transmission, a current value or the like of a solenoid valve that adjusts an engagement state of a clutch by hydraulic pressure may be used as an action variable. Alternatively, for example, as described in the column "Vehicle", when a hybrid vehicle, an electric vehicle, or a fuel cell vehicle is employed as a vehicle, torque or an output of a rotating electric machine may be used as an action variable. For example, when an in-vehicle air-conditioning device including a compressor that rotates with rotational power of a crankshaft of an internal combustion engine is provided, load torque of the compressor may be included in the action variable. When an electric in-vehicle air-conditioning device is provided, the power consumption of the air-conditioning device may be included in the action variable.

State

In the above-described embodiments, although the time-series data of the accelerator operation amount PA is data including the six values sampled at regular intervals, the disclosure is not limited thereto. Data including two or more sampling values at different sampling timings should be used, and in this case, it is more desirable that data including three or more sampling values or data with the regular sampling interval is used.

A state variable relating to the accelerator operation amount is not limited to the time-series data of the accelerator operation amount PA, and for example, as described in the column "Action Variable", the change amount per unit time of the accelerator operation amount PA, or the like may be used.

For example, as described in the column "Action Variable", when the current value of the solenoid valve is the action variable, a rotation speed of the input shaft 52 or a rotation speed of the output shaft 54 of the transmission, and hydraulic pressure that is adjusted by the solenoid valve may be included in the state. Alternatively, as described in the column "Action Variable", when the torque or the output of the rotating electric machine is the action variable, a charging rate or a temperature of the battery may be included in the state. For example, as described in the column "Action Variable", when the load torque of the compressor or the power consumption of the air-conditioning device is included in the action, a temperature in the vehicle cabin may be included in the state.

Dimension Reduction of Data of Table Format

A dimension reduction method of data in a table format is not limited to that illustrated in the above-described embodiments. For example, since the accelerator operation amount PA rarely becomes a maximum value, the action value function Q is not defined on a state for which the accelerator operation amount PA becomes equal to or greater than a specified amount, and the throttle valve opening degree command value TA* and the like when the accelerator operation amount PA becomes equal to or greater than the specified amount may be separately adapted. For example, dimension reduction may be performed by excluding a value with the throttle valve opening degree command value TA* equal to or greater than a specified value from the possible values of the action.

Relationship Definition Data

In the above-described embodiments, although the action value function Q is a function in a table format, the disclosure is not limited thereto. For example, a function approximator may be used.

For example, the policy $\pi$ may be expressed by a function approximator with the state s and the action a as independent variables and the probability of taking the action a as a dependent variable instead of using the action value function Q, and parameters that determine the function approximator may be updated according to the reward r.

Operation Processing

For example, as described in the column "Relationship Definition Data", when the action value function is the function approximator, the action a maximizing the action value function Q should be selected by inputting all sets of discrete values on the action to be the independent variable of the function in a table format in the above-described embodiment to the action value function Q along with the state s.

For example, as described in the column "Relationship Definition Data", when the policy $\pi$ is the function approximator having the state s and the action a as the independent variables and the probability of taking the action a as the dependent variable, the action a should be selected based on the probability indicated by the policy $\pi$.

Update Mapping

In the processing of S38 to S44, although a case where the $\varepsilon$-soft on-policy type Monte Carlo method is used is exemplified, the disclosure is not limited thereto. For example, an off-policy Monte Carlo method may be used. Of course, the disclosure is not limited to the Monte Carlo method, for example, an off-policy type TD method may be used, an on-policy type TD method, such as a SARSA method may be used, or eligibility trace method may be used as on-policy type learning.

For example, as described in the column "Relationship Definition Data", when the policy $\pi$ is expressed using the function approximator, and the policy $\pi$ is updated directly based on the reward r, update mapping may be configured using a policy gradient method or the like.

A target to be directly updated based on the reward r is not limited to any one of the action value function Q and the policy $\pi$. For example, like an actor-critic method, the action value function Q and the policy $\pi$ may be updated. In the actor-critic method, the target to be updated is not limited thereto, and for example, a value function V may be a target to be updated instead of the action value function Q.

"$\varepsilon$" that determines the policy $\pi$ is not limited to a fixed value, and may be changed according to a rule determined in advance according to a degree of progress of learning.

Reward Calculation Processing

In the processing of FIG. 3, although the reward is provided according to whether or not the logical product of the condition (i) and the condition (ii) is true, the disclosure is not limited thereto. For example, processing of providing a reward according to whether or not the condition (i) is satisfied and processing of providing a reward according to whether or not the condition (ii) is satisfied may be executed. For example, in regards to the two kinds of processing of the processing of providing the reward according to whether or not the condition (i) is satisfied and the processing of providing the reward according to whether or not the condition (ii) is satisfied, solely any one kind processing may be executed.

For example, instead of providing the same reward uniformly when the condition (i) is satisfied, processing of providing a greater reward when the absolute value of the difference between the torque Trq and the torque command value Trq* is small than when the absolute value is large may be applied. For example, instead of providing the same reward uniformly when the condition (i) is not satisfied, processing of providing a smaller reward when the absolute value of the difference between the torque Trq and the torque command value Trq* is large than when the absolute value is small may be applied.

For example, instead of providing the same reward uniformly when the condition (ii) is satisfied, processing of making the magnitude of the reward variable according to the magnitude of the acceleration Gx may be applied. For example, instead of providing the same reward uniformly when the condition (ii) is not satisfied, processing of making the magnitude of the reward variable according to the magnitude of the acceleration Gx may be applied.

In the above-described embodiment, although the reward r is provided according to whether or not a criterion relating to drivability is satisfied, the criterion relating to drivability is not limited to that described above, and may be set according to whether or not noise or vibration strength satisfies a criterion. Of course, the disclosure is not limited thereto, and for example, any one of four conditions of whether or not the acceleration satisfies a criterion, whether or not the followability of the torque Trq satisfies a criterion, whether or not noise satisfies a criterion, and whether or not vibration strength satisfies a criterion may be applied.

The reward calculation processing is not limited to providing the reward r according to whether the criterion relating to drivability is satisfied. For example, processing of providing a greater reward when a fuel consumption rate satisfies a criterion than when the fuel consumption rate does not satisfy the criterion may be applied. Alternatively, processing of providing a greater reward when an exhaust characteristic satisfies a criterion than when the exhaust characteristic does not satisfy the criterion may be applied. Note that two or three of three kinds of processing of the processing of providing a greater reward when the criterion relating to drivability satisfies the criterion than when the criterion relating to drivability does not satisfy the criterion, the processing of providing a greater reward when the fuel consumption rate satisfies the criterion than when the fuel consumption rate does not satisfy the criterion, and the processing of providing a greater reward when the exhaust characteristic satisfies the criterion than when the exhaust characteristic does not satisfy the criterion may be included.

For example, as described in the column "Action Variable", when the current value of the solenoid valve of the transmission 50 is the action variable, for example, at least one of the following three kinds of processing (a) to (c) may be included in the reward calculation processing.

(a) Processing of providing a greater reward when a time needed for switching a gear ratio in the transmission is within a predetermined time than when the time exceeds the predetermined time (b) Processing of providing a greater reward when an absolute value of a change rate of the rotation speed of the input shaft 52 of the transmission is equal to or less than an input-side predetermined value than when the absolute value exceeds the input-side predetermined value (c) Processing of providing a greater reward when an absolute value of a change rate of the rotation speed of the output shaft 54 of the transmission is equal to or less than an output-side predetermined value than when the absolute value exceeds the output-side predetermined value For example, as described in the column "Action Variable", when the torque or the output of the rotating electric machine is the action variable, processing of providing a greater reward when the charging rate of the battery is within a predetermined range than when the charging rate of the battery is out of the predetermined range or processing of providing a greater reward when the temperature of the battery is within a predetermined range than when the temperature of the battery is out of the predetermined range may be included. For example, as described in the column "Action Variable", when the load torque of the compressor or the power consumption of the air-conditioning device is included in the action variable, processing of providing a greater reward when the temperature in the vehicle cabin is within a predetermined range than when the temperature in the vehicle cabin is out of the predetermined range may be added.

Vehicle Control System

The vehicle control system is not limited to the vehicle control system constituted of the control device 70 and the data analysis center 110. For example, a portable terminal carried with the user may be used instead of the data analysis center 110, and the vehicle control system may be constituted of the control device 70 and the portable terminal. Alternatively, for example, the vehicle control system may be constituted of the control device 70, the portable terminal, and the data analysis center 110.

Processor

The processor is not limited to the processor that includes the CPU 72 (112) and the ROM 74 (114), and executes software processing. For example, a dedicated hardware circuit, such as an ASIC, in which at least a part of the processing executed by the software in the above-described embodiments is executed by hardware, may be provided. That is, the processor should have a configuration of any one of (a) to (c) described below.

(a) A processing device that executes the entire processing in compliance with a program, and a program storage device that stores the program, such as a ROM, are provided.

(b) A processing device that executes a part of the processing in compliance with a program, a program storage device, and a dedicated hardware circuit that executes the remaining processing are provided.

(c) A dedicated hardware circuit that executes the entire processing is provided. Here, a plurality of software processors including the processing device and the program storage device or a plurality of dedicated hardware circuits may be provided.

Memory

In the above-described embodiments, although the memory that stores the relationship definition data DR and the memory (ROM 74) that stores the learning program 74*b* or the control program 74*a* are separate memories, the disclosure is not limited thereto.

Internal Combustion Engine

The internal combustion engine is not limited to an internal combustion engine including a port injection valve configured to inject fuel to the intake passage 12 as the fuel injection valve, and may be an internal combustion engine including an in-cylinder injection valve configured to inject fuel directly to the combustion chamber 24 or may be, for example, an internal combustion engine including both of a port injection valve and an in-cylinder injection valve.

The internal combustion engine is not limited to a spark ignition type internal combustion engine, and may be, for example, a compression ignition type internal combustion engine or the like using diesel oil or the like as fuel.

Vehicle

The vehicle is not limited to a vehicle in which a thrust generation device is solely an internal combustion engine, and may be, for example, a so-called hybrid vehicle that includes an internal combustion engine and a rotating electric machine. The vehicle may be a so-called electric vehicle or a fuel cell vehicle that does not include an internal combustion engine and includes a rotating electric machine as a thrust generation device.

What is claimed is:

1. A vehicle control device comprising a memory configured to store relationship definition data that defines a relationship between a state of a vehicle, which indicates a current amount of use of a part of the vehicle, and an action variable, which is a variable relating to an operation of electronic equipment in the vehicle, and a processor configured to be communicatively connected to a sensor that is configured to detect the state of the vehicle while the vehicle is being driven, the processor being configured to:

execute acquisition processing of acquiring a detection value of the sensor that is configured to detect the state of the vehicle;

execute operation processing of operating the electronic equipment based on a value of the action variable determined by the detection value acquired through the acquisition processing and the relationship definition data;

execute reward calculation processing of providing, based on the detection value acquired through the acquisition processing, a greater reward when a characteristic of the vehicle satisfies a criterion than when the characteristic of the vehicle does not satisfy the criterion;

execute update processing of updating the relationship definition data with the state of the vehicle based on the detection value acquired through the acquisition processing each time a traveling distance of the vehicle has increased by a predetermined amount, the value of the action variable used for the operation of the electronic equipment, and the reward corresponding to the operation as inputs to update mapping determined in advance, such that subsequent user actions for driving the vehicle will be based on the updated relationship definition data, the updated value of the action variable, and the updated reward;

execute detection processing of detecting that function recovery treatment of a component having an influence on the state of the vehicle resulting from the operation in the operation processing among components in the vehicle is executed;

execute switching processing of, when the execution of the function recovery treatment is detected through the detection processing, switching the relationship definition data for use in the operation processing to post-treatment data that is data a predetermined period before the execution of the function recovery treatment; and based on the update mapping, output the relationship definition data updated to increase an expected return on the reward when the electronic equipment is operated in compliance with the relationship definition data.

2. The vehicle control device according to claim 1, wherein the switching processing includes processing of setting the relationship definition data updated through the update processing with traveling of the vehicle as the post-treatment data.

3. The vehicle control device according to claim 1, wherein:
the processor is configured to execute past data maintenance processing of bringing about a state where the relationship definition data that is updated through the update processing until a predetermined condition is established and avoids update through the update processing after the predetermined condition is established is stored in the memory in addition to the relationship definition data that is updated through the update processing; and
the switching processing includes processing of using the relationship definition data maintained in a state stored in the memory through the past data maintenance processing as the post-treatment data.

4. The vehicle control device according to claim 2, wherein:
the processor is configured to execute past data maintenance processing of bringing about a state where the relationship definition data that is updated through the update processing until a predetermined condition is established and avoids update through the update processing after the predetermined condition is established is stored in the memory in addition to the relationship definition data that is updated through the update processing; and
the switching processing includes processing of using the relationship definition data maintained in a state stored in the memory through the past data maintenance processing as the post-treatment data.

5. The vehicle control device according to claim 1, wherein:
the processor is configured to execute post-treatment data request processing of transmitting a signal for requesting the post-treatment data when the execution of the function recovery treatment is detected through the detection processing and post-treatment data reception processing of receiving the transmitted post-treatment data as a result of the post-treatment data request processing; and
the switching processing includes processing of switching the relationship definition data for use in the operation processing to the received post-treatment data.

6. The vehicle control device according to claim 2, wherein:
the processor is configured to execute post-treatment data request processing of transmitting a signal for requesting the post-treatment data when the execution of the function recovery treatment is detected through the detection processing and post-treatment data reception processing of receiving the transmitted post-treatment data as a result of the post-treatment data request processing; and
the switching processing includes processing of switching the relationship definition data for use in the operation processing to the received post-treatment data.

7. A vehicle control system comprising:
a memory configured to store relationship definition data that defines a relationship between a state of a vehicle, which indicates a current amount of use of a part of the vehicle, and an action variable, which is a variable relating to an operation of electronic equipment in the vehicle; and
a processor including a first processor mounted in the vehicle and a second processor different from an in-vehicle device, wherein
the first processor is configured to be communicatively connected to a sensor that is configured to detect the state of the vehicle while the vehicle is being driven, the first processor being configured to execute acquisition processing of acquiring a detection value of the sensor that is configured to detect the state of the vehicle,
the first processor is configured to execute operation processing of operating the electronic equipment based on a value of the action variable determined by the detection value acquired through the acquisition processing and the relationship definition data,
the first processor is configured to execute detection processing of detecting that function recovery treatment of a component having an influence on the state of the vehicle resulting from the operation in the operation processing among components in the vehicle is executed,
the first processor is configured to perform update processing of updating the relationship definition data with the state of the vehicle based on the detection value acquired through the acquisition processing each time a traveling distance of the vehicle has increased by a predetermined amount, such that subsequent user actions for driving the vehicle will be based on the updated relationship definition data,
the second processor is configured to, when the execution of the function recovery treatment is detected through the detection processing, execute post-treatment data transmission processing of transmitting post-treatment data that is data a predetermined period before the execution of the function recovery treatment, and
the first processor is configured to execute post-treatment data reception processing of receiving data transmitted through the post-treatment data transmission processing.

8. The vehicle control system according to claim 7, wherein the first processor is configured to execute the detection processing and post-treatment data request processing of transmitting a signal for requesting the post-treatment data when the execution of the function recovery treatment is detected through the detection processing.

9. The vehicle control system according to claim 7, wherein the post-treatment data transmission processing includes processing of transmitting, as the post-treatment data, the relationship definition data in a vehicle in which a degree of deterioration of the component is lower than the vehicle in which the function recovery treatment is executed.

10. The vehicle control system according to claim 8, wherein the post-treatment data transmission processing includes processing of transmitting, as the post-treatment data, the relationship definition data in a vehicle in which a degree of deterioration of the component is lower than the vehicle in which the function recovery treatment is executed.

11. A method for controlling a vehicle, the vehicle including a memory, and a processor that is communicatively connected to a sensor that is configured to detect the state of the vehicle while the vehicle is being driven, the memory being configured to store relationship definition data that defines a relationship between a state of a vehicle, which indicates a current amount of use of a part of the vehicle, and an action variable, which is a variable relating to an operation of electronic equipment in the vehicle, the method comprising:
   executing, by the processor, acquisition processing of acquiring a detection value of the sensor that is configured to detect the state of the vehicle;
   executing, by the processor, operation processing of operating the electronic equipment based on a value of the action variable determined by the detection value acquired through the acquisition processing and the relationship definition data;
   executing, by the processor, reward calculation processing of providing, based on the detection value acquired through the acquisition processing, a greater reward when a characteristic of the vehicle satisfies a criterion than when the characteristic of the vehicle does not satisfy the criterion;
   executing, by the processor, update processing of updating the relationship definition data with the state of the vehicle based on the detection value acquired through the acquisition processing each time a traveling distance of the vehicle has increased by a predetermined amount, the value of the action variable used for the operation of the electronic equipment, and the reward corresponding to the operation as inputs to update mapping determined in advance, such that subsequent user actions for driving the vehicle will be based on the updated relationship definition data, the updated value of the action variable, and the updated reward;
   executing, by the processor, detection processing of detecting that function recovery treatment of a component having an influence on the state of the vehicle resulting from the operation in the operation processing among components in the vehicle is executed;
   executing, by the processor, switching processing of, when the execution of the function recovery treatment is detected through the detection processing, switching the relationship definition data for use in the operation processing to post-treatment data that is data a predetermined period before the execution of the function recovery treatment; and
   based on the update mapping, outputting, by the processor, the relationship definition data updated to increase an expected return on the reward when the electronic equipment is operated in compliance with the relationship definition data.

12. The method for controlling a vehicle according to claim 11, wherein the switching processing includes processing of setting the relationship definition data updated through the update processing with traveling of the vehicle as the post-treatment data.

13. The method for controlling a vehicle according to claim 11, further comprising,
   executing, by the processor, past data maintenance processing of bringing about a state where the relationship definition data that is updated through the update processing until a predetermined condition is established and avoids update through the update processing after the predetermined condition is established is stored in the memory in addition to the relationship definition data that is updated through the update processing, wherein
   the switching processing includes processing of using the relationship definition data maintained in a state stored in the memory through the past data maintenance processing as the post-treatment data.

14. The method for controlling a vehicle according to claim 12, further comprising,
   executing, by the processor, past data maintenance processing of bringing about a state where the relationship definition data that is updated through the update processing until a predetermined condition is established and avoids update through the update processing after the predetermined condition is established is stored in the memory in addition to the relationship definition data that is updated through the update processing, wherein
   the switching processing includes processing of using the relationship definition data maintained in a state stored in the memory through the past data maintenance processing as the post-treatment data.

15. The method for controlling a vehicle according to claim 11, further comprising,
   executing, by the processor, post-treatment data request processing of transmitting a signal for requesting the post-treatment data when the execution of the function recovery treatment is detected through the detection processing and post-treatment data reception processing of receiving the transmitted post-treatment data as a result of the post-treatment data request processing, wherein
   the switching processing includes processing of switching the relationship definition data for use in the operation processing to the received post-treatment data.

16. The method for controlling a vehicle according to claim 12, further comprising,
   executing, by the processor, post-treatment data request processing of transmitting a signal for requesting the post-treatment data when the execution of the function recovery treatment is detected through the detection processing and post-treatment data reception processing of receiving the transmitted post-treatment data as a result of the post-treatment data request processing, wherein
   the switching processing includes processing of switching the relationship definition data for use in the operation processing to the received post-treatment data.

17. The method for controlling a vehicle according to claim 11, the processor includes a first processor mounted in the vehicle and a second processor different from an in-vehicle device, the method further comprising
   executing, the acquisition processing, the operation processing, and the detection processing,
   when the execution of the function recovery treatment is detected through the detection processing, executing, by the second processor, post-treatment data transmission processing of transmitting post-treatment data that is data a predetermined period before the execution of the function recovery treatment, and
   executing, by the first processor, post-treatment data reception processing of receiving data transmitted through the post-treatment data transmission processing.

* * * * *